United States Patent
Scully

(10) Patent No.: US 9,167,083 B2
(45) Date of Patent: *Oct. 20, 2015

(54) IDENTIFYING RECYCLED TELEPHONE NUMBERS

(71) Applicant: Soundbite Communications, Inc., Bedford, MA (US)

(72) Inventor: Michael N. B. Scully, Charlotte, NC (US)

(73) Assignee: SOUNDBITE COMMUNICATIONS, INC., Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/542,696

(22) Filed: Nov. 17, 2014

(65) Prior Publication Data
US 2015/0071424 A1  Mar. 12, 2015

Related U.S. Application Data

(63) Continuation of application No. 13/710,499, filed on Dec. 11, 2012, now Pat. No. 8,891,750.

(51) Int. Cl.
*H04M 3/42* (2006.01)
*H04W 8/28* (2009.01)

(52) U.S. Cl.
CPC ............ *H04M 3/42059* (2013.01); *H04W 8/28* (2013.01)

(58) Field of Classification Search
CPC ............. H04M 3/42153; H04M 2207/12; H04Q 3/0029
USPC .......................... 379/201.12, 207.02
See application file for complete search history.

(56) References Cited

U.S. PATENT DOCUMENTS

| | | | | |
|---|---|---|---|---|
| 5,781,616 A * | 7/1998 | Youngs et al. | ............. | 379/88.01 |
| 5,883,948 A * | 3/1999 | Dunn | ........................ | 379/221.09 |
| 6,411,698 B1 * | 6/2002 | Bauer et al. | ............. | 379/207.01 |
| 7,424,442 B2 * | 9/2008 | Wong et al. | ................. | 705/14.68 |
| 7,437,148 B1 * | 10/2008 | Vaghi et al. | .................... | 455/417 |
| 7,602,894 B1 * | 10/2009 | Shaffer et al. | ............. | 379/210.02 |
| 7,848,499 B2 * | 12/2010 | Michonski | ............... | 379/114.13 |
| 2011/0231239 A1 * | 9/2011 | Burt et al. | .................. | 705/14.41 |

* cited by examiner

*Primary Examiner* — Simon Sing
(74) *Attorney, Agent, or Firm* — Christie, Parker & Hale, LLP

(57) ABSTRACT

An automated method begins by receiving a list of numbers that have been de-activated by a carrier. Periodically, and for each number, a request is made to identify a current carrier for the number. If the current carrier matches the carrier that provided the de-activation information, the mobile number is considered to be in a first state, i.e., shut off and returned to a pool of numbers that are available to this same carrier. Upon a determination that the number is in the first state, the provider issues a request to any opt-in database to delete any express consent or other similar data associated with the number. If, however, the number does not match the carrier of deactivation, the number is considered to be in a second state, i.e., likely to have been ported by the same user to a new carrier. This state is logged in an audit trail.

13 Claims, 4 Drawing Sheets

IDENTIFYING RECYCLED TELEPHONE NUMBERS

BACKGROUND

1. Technical Field

This disclosure relates generally to telephone number identification.

2. Description of the Related Art

Under the Federal Communications Commission's (FCC's) "local number portability" (LNP) rules, as long as a user remains in the same geographic area, he or she can switch telephone service providers yet retain his or her existing phone number. Currently, upon mobile number deactivation, there is no easy way to tell whether a mobile number has been transferred from one carrier to another in this manner (i.e., via number portability) or, rather, has merely been recycled by the carrier and is now being, or soon will be, used by a different individual. The inability to identify whether a mobile number has been ported or is being recycled also has implications for maintaining valid express consent according to the Telephone Consumer Protection Act (TCPA), which generally prohibits the making of a call with an automatic dialer or pre-recorded voice to any phone number unless there is an emergency purpose, or the caller has the prior express consent of the "called party."

For companies (such as customer communications providers) concerned about messaging or calling a recycled mobile number, such entities may choose to lower their risk by not sending any messages or calls to mobile numbers just to be on the safe side. In such case, these companies would be giving up the benefit they had anticipated initially from making these calls and sending these messages, and mobile phone subscribers would be denied the benefit anticipated by receiving these calls and messages.

Thus, there is a need in the art to provide automated techniques for identifying recycled (as opposed to ported) mobile numbers.

BRIEF SUMMARY

A method to identify the source of a mobile telephone number is implemented by a provider, e.g., a customer communications platform that provides notification services to its customers. The method is automated and begins by receiving a list of mobile numbers that have been turned off by a carrier. Typically, the list is in the form of a "deactivation file" that is provided by the carrier. A list of this type typically includes numbers of a first type, and numbers of a second type. The first type corresponds to closed accounts (with mobile numbers that may get recycled), and the second type corresponds to ported numbers (that have been moved to another carrier). The file is assumed to have numbers according to both types, but without the first type and/or second type specified. The identity of the carrier that provided the "deactivated" number is maintained in association with the mobile number. Preferably, similar lists are obtained from other carriers, and a master list is created.

Periodically (e.g., daily), and for each mobile number on the master list, a request is then made to a third party data source to identify a current carrier for the number. In one approach, the request is issued using an application programming interface (API) to a third party service (e.g., NetNumber) through which the identification of a carrier and the status of a particular mobile number may be obtained. For each request, a response is received. If the current carrier returned from the call to the third party data source matches the carrier that provided the deactivation information, the mobile number is considered to be in a first (likely-to-be-recycled) state, i.e., shut off and returned to a pool of numbers that are available to this same carrier. Upon a determination that the mobile number is in the first state, the provider then issues a request to each opt-in database associated with the provider, e.g. to delete any express consent or other similar data associated with the mobile number. If, however, based on the information returned from the third party data source the number does not match the carrier of deactivation, the mobile number is considered to be in a second state, i.e., likely to have been ported by the same user to a new carrier (as an authorized user of the account is the only one that can authorize such an account change). This state is logged in an audit trail but, preferably, does not revoke any opt-in otherwise associated with the mobile number.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

Figure 1:
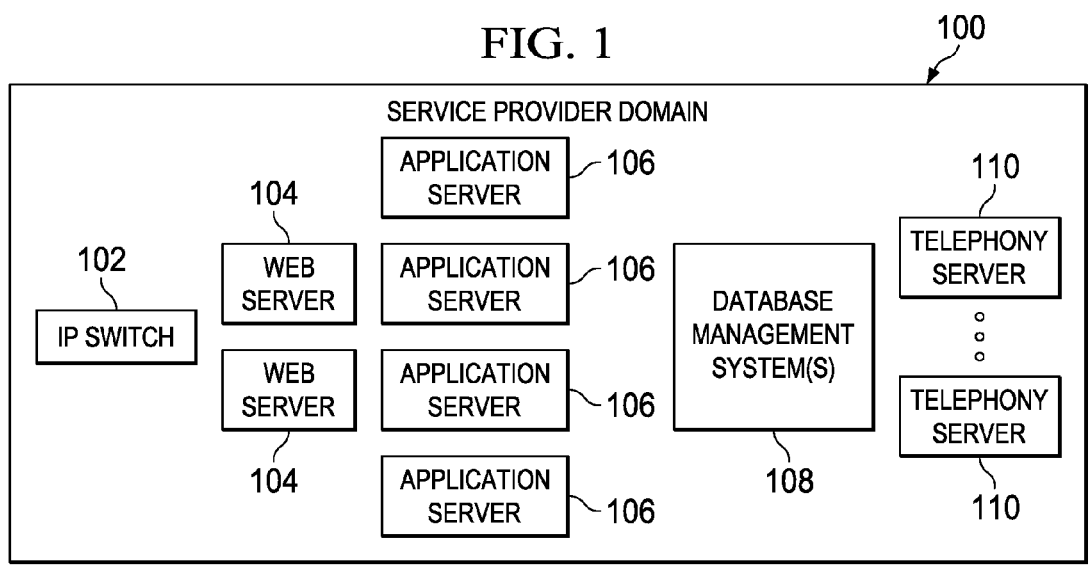
FIG. 1 is a block diagram of a service provider infrastructure for implementing a managed communications campaign service and in which the subject matter of this disclosure may be implemented.

The technique herein may be used by a service provider that enables personalized, multi-channel customer communications. FIG. 1 illustrates a representative service provider or system architecture of this type. The approach is not limited for use with a service provider that provides customer communications, as it may also be implemented by other entities.

The service provider architecture typically is implemented in or across one or more data centers. A data center typically has connectivity to the Internet. Generally, and as well-known, the system provides a web-based hosted solution through which business entities create and manage communications campaigns. Campaigns may be interactive or non-interactive. Representative campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to call center campaigns, appointment reminder campaigns, welcome call campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, auto-responder campaigns, trivia/ sweepstakes campaigns, marketing alert campaigns, and the like. The particular type of campaign is not a limitation or feature of the invention.

In a well-known operation, a business entity (a "client") user has a machine such as a workstation, notebook or laptop computer, tablet or other mobile device. Typically, a business entity user accesses the service provider architecture by opening a web browser on the machine to a URL associated with a service provider domain. (In an alternative, the client may operate its own dedicated client application in lieu of a web browser to access a server side of the application.) Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 9.2 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. In a card-based embodiment, a representative card is a CG 6565 (or variant) series available from Dialogic, or an equivalent. Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has up to 200 ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm.

Figure 2A:
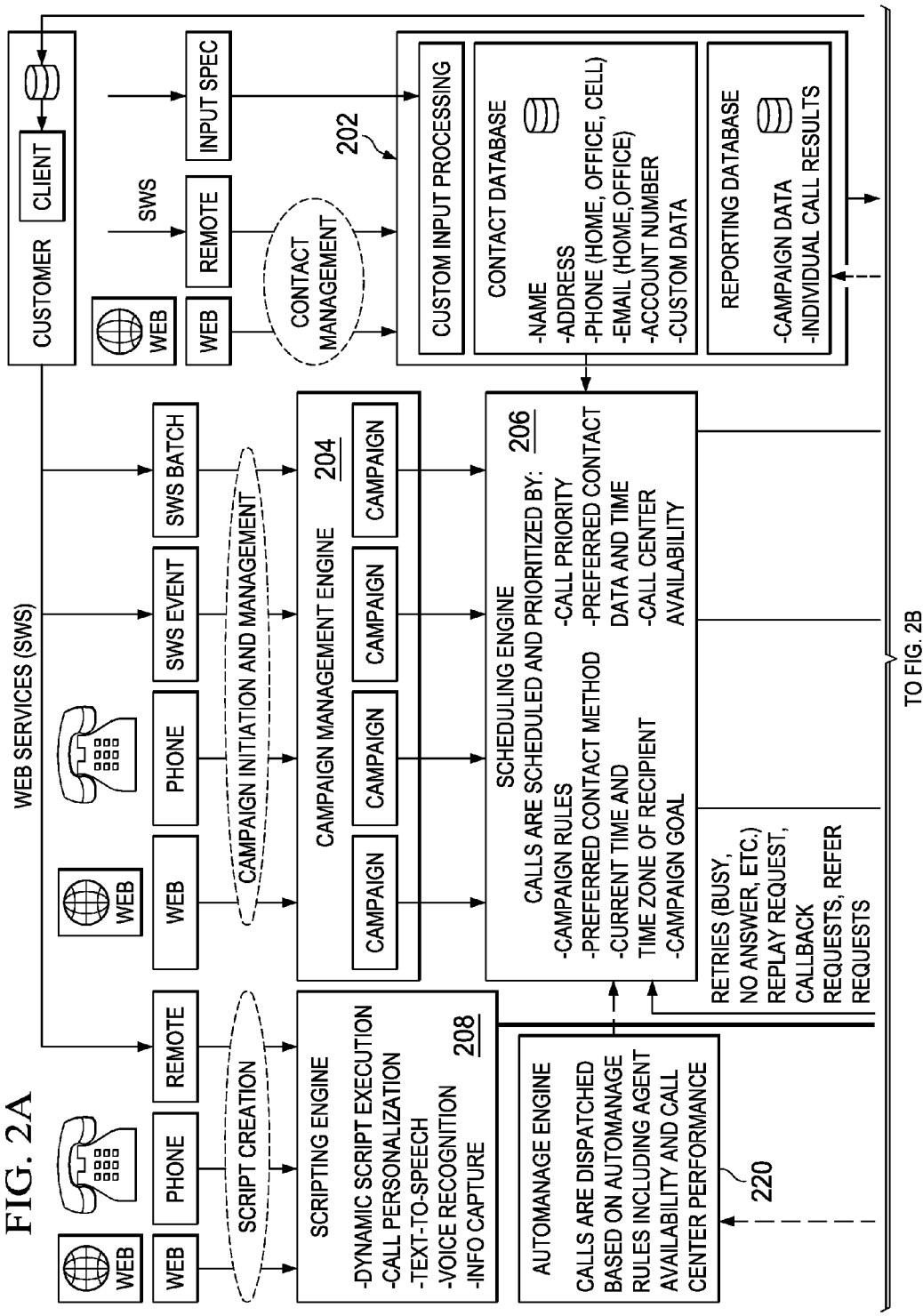
FIGS. 2A-2B illustrate how an interactive communications campaign is created and managed in the service provider infrastructure illustrated in FIG. 1.
Figure 2B:
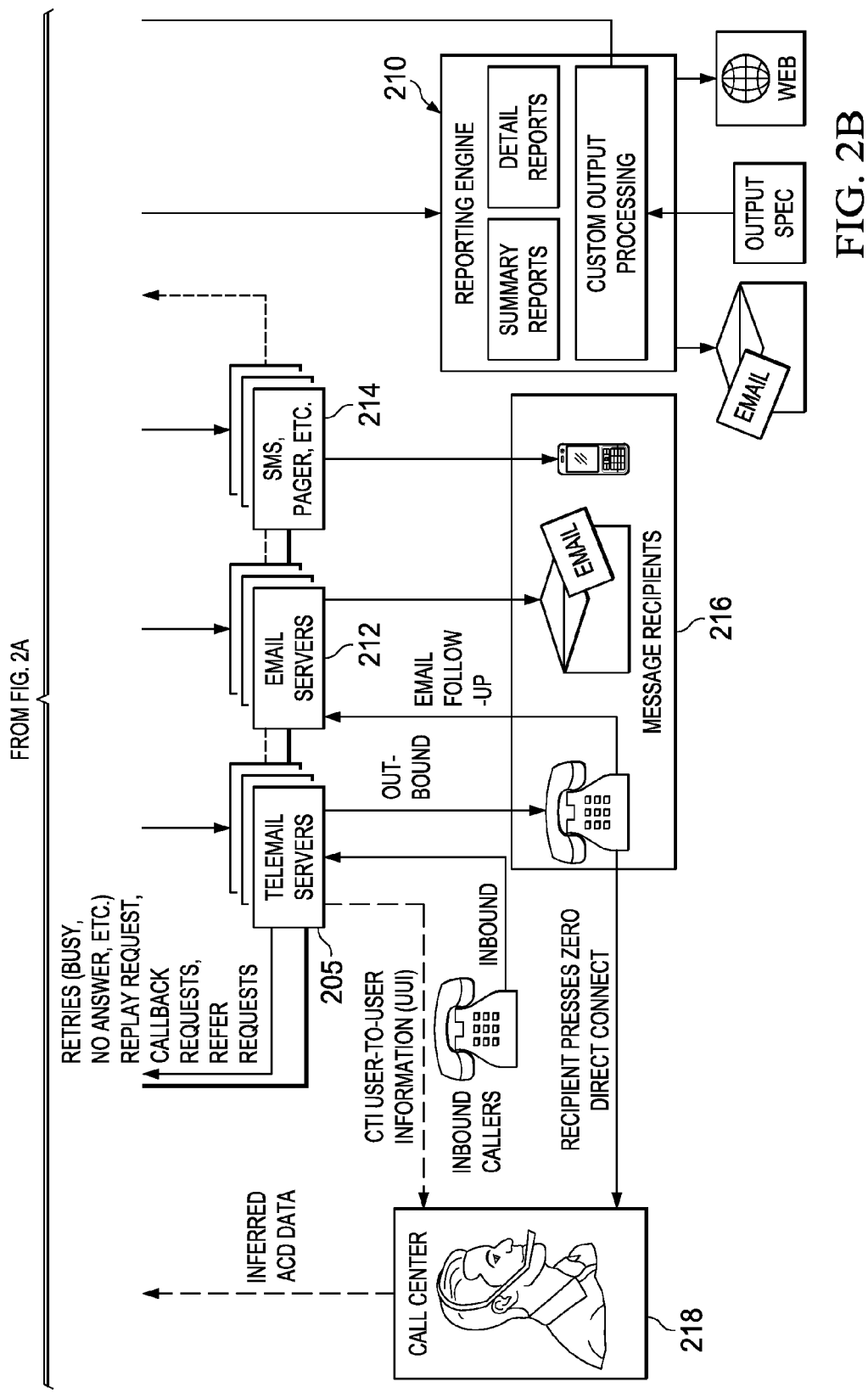

Using the service provider infrastructure, a business entity can create, execute and manage a campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. A script determines what will happen during a phone call. Typically, a script is formatted as XML and specifies a sequence of audio prompts that are played and what happens when the recipient takes certain actions such as pressing a button on the phone or speaking a response. One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information. With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

As also illustrated in FIGS. 2A-2B, after connecting an outbound call to a target customer 216, the customer may elect to be connected to the contact center 218 (typically a third party call center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is provided by the control engine 220, which is responsible for dispatching calls at an appropriate rate while ensuring that all customer-requested rule parameters are honored.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance.

A "campaign" refers to an overall series of calls to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a phone call. Typically, the script specifies a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

The hosted service typically also includes a preference management (PM) module (or platform). The PM system maintains a set of consumer preferences or attributes related to communication and behavior. These include, among many others, opt-in, opt-in date, opt-in method, and opt-in user. The service maintains databases of such opt-in preferences and values. Preferably, consumer preferences are created, maintained and accessed in one of several ways: via a web-based portal, via a voice portal, via an application programming interface (API), or via a mobile or smartphone application. The users of the preference management system typically include, without limitation, a client administrator, a client customer service representative, or the consumer himself or herself (in other words, the client's customers).

The users of the PM function are administrators, customer service representatives and consumers. Client administrators log into the preference management system to setup and manage preference management list, view preference management system status, run preference management reports, create or disable user logins for customer service representatives, designate a CSR as read-only (not allowed to edit attributes or subscriptions), designate a CSR as read/write (allowed to edit attributes and subscriptions, subject to access control lists (ACLs) on attributes), change passwords for customer service representatives, and generate and export a preference list on Consumer preferences. CSRs log into the platform to search for a consumer, view consumer preferences (as permitted by an access control list or ACL), and edit consumer preferences (as permitted by an ACL). Some customer service representatives may have permission to edit preferences, while others may only have permission to search for and view such preferences. Consumers log into the preference management platform to view his/her preferences (as allowed by ACLs), and to edit his/her preferences (as allowed by ACLs). The target users log into the system via a web user interface, a voice portal, or some other interface, e.g., one provided by a third party via the API.

Identifying Recycled Mobile Numbers

With the above as background, the technique of this disclosure is now described.

Figure 3:
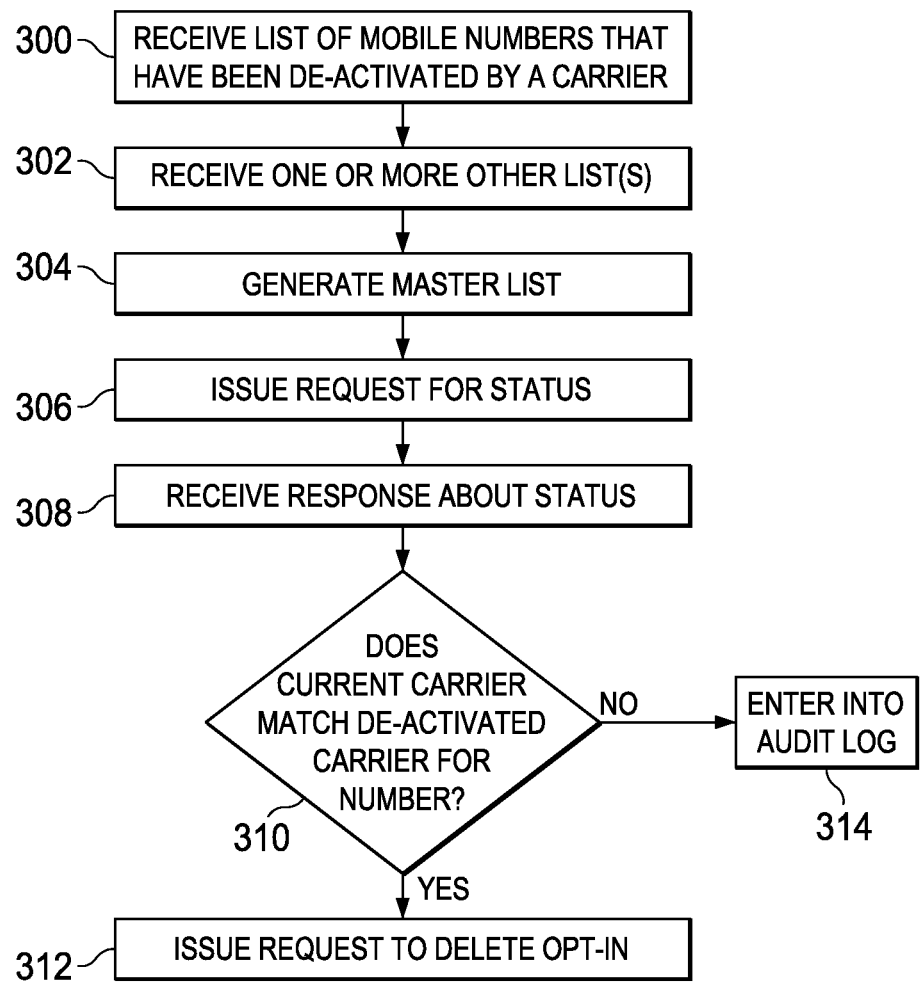
FIG. 3 is a process flow illustrating a technique of identifying recycled or ported telephone numbers according to this disclosure.

The technique is an automated method to identify the source of a telephone number, typically a mobile number. As illustrated in the process flow in FIG. 3, the method begins at step 300 by receiving a list of mobile numbers that have been turned off by a carrier. The list includes numbers of a first type, and numbers of a second type. The first type corresponds to closed accounts (with mobile numbers that may get recycled), and the second type corresponds to ported numbers (that have been moved to another carrier). Preferably, and at step 302, one or more similar lists are obtained from one or more other carriers. At step 304, a master list is created. Periodically (e.g., daily), and for each mobile number on the master list, a request is made to a third party data source to identify a current carrier for the number. This is step 306. For each request, a response is received. This is step 308. A test 310 is then performed to determine if the current carrier returned from the call to the third party data source matches the carrier that provided the deactivation information. If the outcome of the test at step 310 is positive, the mobile number is considered to be in a first (likely-to-be-recycled) state, i.e., shut off and returned to a pool of numbers that are available to this same carrier. The routine then continues at step 312 to issue a request to each opt-in database associated with the provider. The request is step 312 is a request to delete any express consent or other similar data associated with the mobile number. Preferably, step 312 is carried out programmatically and in an automated manner. This operation may be carried out using an application program interface or other messaging mechanisms. If, however, the outcome of the test at step 310 is negative, in other words, if the number does not match the carrier of deactivation, the routine continues at step 314. In this path, the mobile number is considered to be in a second state, i.e., likely to have been ported by the same user to a new carrier (as an authorized user of the account is the only one that can authorize such an account change). The routine then continues at this step to log this state in an audit trail. A negative outcome to the test at step 310 preferably does not revoke any opt-in otherwise associated with the mobile number. This completes the process.

Without limitation, step 306 is implemented via an application programming interface (API) to a third party data source, such as NetNumber.

In an alternative embodiment, the "list" of deactivated number(s) may be generated by the service proactively.

The same approach also may be implemented to determine whether a particular landline number has been ported (e.g., for mobile use) or it otherwise being recycled by the carrier.

The technique may be implemented as a computer program, namely, as a set of computer program instructions executed by one or more data (hardware) processors.

The approach herein has many advantages. It enables the service provider to identify whether a telephone number is being recycled or, rather, has been ported (from one mobile carrier to a new carrier, from a landline to a mobile line, or the like). The service provider obtains or generates a list of numbers that have been (or are believed to be) turned off (or de-activated). From this deactivation list, requests are generated to determine a current carrier for each number. Depending on the responses to these requests, the system then determines the status of the number as being either recycled or ported. Appropriate downstream actions are then taken with respect to the opt-in or other similar data that may be stored in the service provider databases for that number. This approach ensures that the service provider opt-in databases are maintained current to facilitate regulatory and other compliance.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an software-as-a-service (SaaS) model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

Preferably, the functionality is implemented in an application layer solution, although this is not a limitation. The functionality may be implemented with application layer protocols such HTTP and HTTPS, or any other protocol having similar operating characteristics.

The invention claimed is:

1. An apparatus operative in association with one or more service provider opt-in databases, comprising:
   one or more hardware processors;
   computer memory holding computer program instructions executed by the one or more hardware processors to:
   receive one or more de-activation lists from one or more carriers;
   periodically, and for each telephone number identified on a given de-activation list, issue a request to determine a current carrier associated with that telephone number;
   when the current carrier matches an identification of a carrier that had identified the telephone number as being de-activated, identify the telephone number as being recycled; and
   for each recycled telephone number, issue to each of the one or more service provider opt-in databases an instruction to delete any opt-in data associated with the telephone number.

2. The apparatus as described in claim 1 wherein the telephone number is a mobile telephone number.

3. The apparatus as described in claim 1 wherein the opt-in data is associated with an express consent.

4. The apparatus as described in claim 1 wherein the instruction is issued programmatically.

5. The apparatus as described in claim 1 wherein the request is issued over an application programming interface (API).

6. The apparatus as described in claim 1 wherein the computer program instructions execute as software-as-a-service.

7. The apparatus as described in claim 1 wherein when the current carrier does not match an identification of a carrier that had identified the telephone number as being de-activated, the computer program instructions are further operative to identify the telephone number as being ported.

8. A method for managing one or more service provider opt-in databases, the method comprising:
   receive, by a processor, one or more de-activation lists from one or more carriers;
   periodically, and for each telephone number identified on a given de-activation list, issuing, by the processor, a request to determine a current carrier associated with that telephone number;
   when the current carrier matches an identification of a carrier that had identified the telephone number as being de-activated, identifying, by the processor, the telephone number as being recycled; and
   for each recycled telephone number, issuing, by the processor, to each of the one or more service provider opt-in databases an instruction to delete any opt-in data associated with the telephone number.

9. The method of claim 8, wherein the telephone number is a mobile telephone number.

10. The method of claim 8, wherein the opt-in data is associated with an express consent.

11. The method of claim 8, wherein the instruction is issued programmatically.

12. The method of claim 8, wherein the request is issued over an application programming interface (API).

13. The method of claim 8, wherein when the current carrier does not match an identification of a carrier that had identified the telephone number as being de-activated, the method further comprises identifying, by the processor, the telephone number as being ported.

* * * * *